United States Patent [19]

Minford et al.

[11] Patent Number: 4,983,463
[45] Date of Patent: Jan. 8, 1991

[54] HYBRID COMPOSITE STRUCTURES OF FIBER REINFORCED GLASS AND RESIN MATRICES

[75] Inventors: Eric Minford, South Windsor; Karl M. Prewo, Vernon, both of Conn.; Robert J. Miller, North Palm Beach, Fla.

[73] Assignee: United Technologies Corporation, Hartford, Conn.

[21] Appl. No.: 257,480

[22] Filed: Oct. 13, 1988

Related U.S. Application Data

[62] Division of Ser. No. 84,368, Aug. 12, 1987.

[51] Int. Cl.$^5$ .......................... B32B 17/10; B32B 7/04
[52] U.S. Cl. ................................. 428/435; 428/473.5; 428/113; 428/704; 428/902
[58] Field of Search ............... 428/408, 417, 432, 446, 428/702, 698, 473.5, 435; 92/212, 213, 224, 248

[56] References Cited

U.S. PATENT DOCUMENTS

| | | | |
|---|---|---|---|
| 4,306,489 | 12/1981 | Driver et al. | 92/212 |
| 4,341,826 | 7/1982 | Prewo et al. | 428/698 |
| 4,395,514 | 7/1983 | Edelman | 524/600 |
| 4,450,610 | 5/1984 | Schaper | 92/212 |
| 4,455,207 | 6/1984 | Sartor et al. | 204/192.34 |
| 4,595,623 | 7/1986 | Du Pont et al. | 428/195 |
| 4,714,467 | 12/1987 | Lechner et al. | 623/16 |
| 4,736,676 | 4/1988 | Taylor | 92/212 |
| 4,738,902 | 4/1988 | Prewo et al. | 428/697 |
| 4,753,835 | 6/1988 | Misumi et al. | 428/74 |
| 4,870,827 | 10/1989 | McFarlin et al. | 62/6 |

Primary Examiner—George F. Lesmes
Assistant Examiner—Christopher Brown
Attorney, Agent, or Firm—Kevin E. McVeigh; James M. Rashid

[57] ABSTRACT

A process for fabricating a composite article is disclosed. A surface of a preconsolidated fiber reinforced glass matrix composite structure is pretreated to promote adhesion to the surface, a mass of fiber-containing uncured resin is molded in contact with the pretreated surface and the resin is cured to consolidate a fiber reinforced resin matrix composite structure and simultaneously bond the resin matrix composite structure to the glass matrix composite structure. An external flap for a gas turbine engine fabricated by the above process is also disclosed.

1 Claim, 2 Drawing Sheets

HYBRID COMPOSITE STRUCTURES OF FIBER REINFORCED GLASS AND RESIN MATRICES

This is a division of copending U.S. application Ser. No. 07/084,368 filed on Aug. 12, 1987.

TECHNICAL FIELD

The field of art to which this invention pertains is fiber reinforced composite materials.

BACKGROUND ART

It has been widely recognized that the selective use of fiber reinforced composite materials to replace metals can result in significant performance benefits. These benefits arise from the exceptional combination of high stiffness, high strength and low density that characterize fiber reinforced composite materials and from the ability to tailor the properties of a particular composite article to fit the demands of a particular application. The use of composites has expanded rapidly, particularly within the aerospace and automotive industries.

The range of applications to which composite materials may theoretically be applied is broadly defined by such absolute limits as the maximum use temperature obtainable with current materials. However, the range of applications to which composite materials may practically be applied is more narrowly defined by practical limits reflecting the trade-off of properties inherent in the design of any composite article. For example, while a graphite fiber reinforced metal matrix composite might conceivably be used in a relatively low temperature application for which the properties of a fiber reinforced epoxy matrix composite would be adequate, it would be impractical to do so because of the increase in cost, density and difficulty of fabrication and the lack of any significant benefit attending the substitution. Similarly, there are applications that fall within the broad scope of the current state of the composite art, in which composites might theoretically be used, but where the trade-off of properties and cost renders such uses impractical.

There is a constant intensive search in this art for means by which composite articles having a more advantageous balance of properties may be obtained in order to further expand the range of applications in which the use of composite materials is beneficial.

What is needed in this art is a technique by which composite articles having a broader range of application may be fabricated.

DISCLOSURE OF INVENTION

A process for fabricating a composite article is disclosed. A surface of a preconsolidated fiber reinforced glass matrix composite structure is pretreated to promote adhesion to the surface, a mass of fiber-containing uncured resin is molded in contact with the pretreated surface and the resin is cured to consolidate a fiber reinforced resin matrix composite structure and simultaneously bond the resin matrix composite structure to the glass matrix composite structure.

A further aspect of the disclosure is a composite article fabricated by the above process.

The foregoing and other features and advantages of the present invention will become more apparent from the following description and accompanying drawings.

BEST MODE FOR CARRYING OUT THE INVENTION

Figure 1:
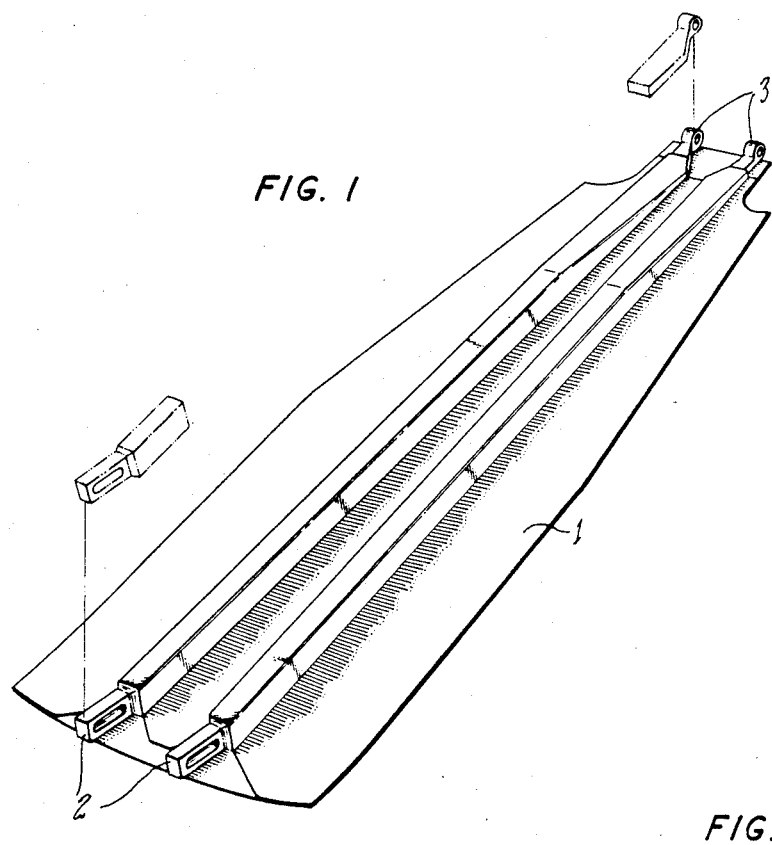
FIG. 1 shows a hybrid composite external flap for a gas turbine engine.

The fiber reinforced glass matrix composite of the present invention comprises a fiber reinforcement embedded in a glass or glass ceramic matrix material.

The glass matrix material is chosen to impart high strength, thermal stability and abrasion resistance to the glass matrix composite. Aluminosilicate (e.g. Corning 1723), high silica content (e.g. Corning 7930), and borosilicate (e.g. Corning 7740) glasses as well as mixtures of glasses are suitable matrix materials. Glass ceramic materials (e.g. lithium aluminosilicate) may also be used as the glass matrix material. Borosilicate glass is preferred, because it is more easily processed than the other glass matrix materials and its thermal stability, although not as high as the other glass materials, is adequate for practice of the present invention. A borosilicate glass, known as Corning 7740, has been found to be particularly well suited to the practice of the present invention. The Corning 7740 glass has a tensile modulus of $9.1 \times 10^6$ pounds per square inch (psi), a density of 2.23 grams per cubic centimeter (g/cm$^3$), a coefficient of thermal expansion of $32.5 \times 10^{-7}$ centimeter per centimeter—degree centigrade (cm/cm °C.), an anneal point of 560° C., a softening point of 821° C., and a liquidus temperature of 1017° C.

The fiber reinforcement in the glass matrix composite may comprise any fiber that exhibits a tensile strength greater than about $200 \times 10^3$ psi, a tensile modulus greater than about $25 \times 10^6$ psi, and is stable at temperatures up to about 1400° C. Suitable fibers include graphite fibers, silicon carbide fibers and refractory metal oxide fibers. Graphite and silicon carbide fibers are preferred. The fiber reinforcement may be continuous or discontinuous. A continuous graphite fiber that was found to be well suited to the practice of the present invention is known as HMU and is available from Hercules Corp. The HMU fiber has a tensile strength of $400 \times 10^3$ psi, a tensile modulus of $55 \times 10^6$ psi, a coefficient of thermal expansion of $-8 \times 10^{-7}$ cm/cm °C. and a density of 1.84 g/cm$^3$. A discontinuous graphite fiber that was found to be suitable is known as Celion ® fiber, available from BASF. The Celion ® fibers have a tensile strength of $400 \times 10^3$ psi, a tensile modulus of $34 \times 10^6$ psi, a coefficient of thermal expansion of $-7 \times 10^{-7}$ cm/cm °C., and an average length of about 2 centimeters.

The fiber reinforced resin matrix composite of the present invention comprises a fiber reinforcement embedded in a resin matrix material.

The resin matrix comprises a resin material that imparts thermal stability and high strength to the fiber reinforced resin matrix composite. Suitable resins include epoxy resins, bismaleiimide resins and polyimide resins. Polyimide resins are most preferred. A polyimide resin, known as PMR 15, available from CTL-Dixie, Inc., was found to be particularly well suited for use in the practice of the present invention. The PMR 15 resin has a tensile strength of $7 \times 10^3$ psi, a tensile modulus of $6.5 \times 10^5$ psi, a coefficient of thermal expansion of $306 \times 10^{-7}$ cm/cm °C., a density of 1.30 g/cm$^3$ and a heat deflection temperature of 330° C.

The fiber reinforcement in the resin matrix composite may comprise any fiber that exhibits a tensile strength greater than about $10 \times 10^3$ psi, a tensile modulus greater than about $10 \times 10^6$ psi, thermal stability at temperatures up to about 700° C. and is wettable by the matrix material. Suitable fibers include refractory metal oxide fibers (e.g. mullite fibers, alumina fibers and Nextel ® ceramic fibers manufactured by 3M Corp.), silicon carbide fibers (e.g. Nicalon ® silicon carbide fibers manufactured by Nippon Carbon Company), and graphite fibers. Graphite fibers are preferred. A graphite fiber known as Celion ® fiber, available from BASF was found to be particularly well suited for use in the practice of the present invention. The Celion ® fibers have a tensile strength of $400 \times 10^3$ psi, a tensile modulus of $34 \times 10^6$ psi, and a thermal coefficient of expansion of $-7 \times 10^{-7}$ cm/cm °C.

The selection of glass and resin matrix materials, fiber materials, the fiber orientation and fiber volume fraction in the hybrid composite structure are based on the particular demands of the particular application.

It is preferred that the fiber reinforcement comprises a volume fraction of between about 20 percent and about 60 percent of the fiber reinforced glass matrix composite material. It is difficult to obtain a proper distribution of fibers if the volume fraction of fiber is below about 20 percent, and the shear properties of the glass matrix composite material are reduced if the volume fraction of fiber exceeds about 60 percent.

It is preferred that the fiber reinforcement comprise a volume fraction between about 50 percent and about 65 percent of the fiber reinforced resin matrix composite material. At fiber loadings below about 50 volume percent, the physical properties of the matrix material dominate and the improved physical properties that characterize fiber reinforced resin matrix composite materials are not fully realized. Fiber loadings above about 65 volume percent have a detrimental effect on the shear properties of the resin matrix composite material.

It should be noted that in the design of a hybrid article according to the present invention, it is extremely important to consider the potential effects of differential thermal expansion of the dissimilar components of the hybrid. To avoid the potential deformation of the article or failure of the resin matrix to glass matrix bond that could result from differential expansion during temperature changes, it is necessary that the thermal expansion coefficients of the two materials be compatible. Tailoring of the thermal coefficient of expansion of a composite material may be achieved by judicious choices of fiber and matrix materials and of the proportions in which they are combined. The thermal expansion coefficient must thus be traded off against other properties in fabricating the composite article.

Compatible thermal expansion coefficients are those sufficiently similar within the anticipated temperature range of fabrication and use that the stresses generated at the interface of the dissimilar composite materials as the hybrid article undergoes changes in temperature are not sufficient to overcome the strength of the bond between the two materials, and that the stresses transferred across the resin matrix/glass matrix bondline are not sufficient to deform the article beyond predetermined tolerances. The closeness of the match between the coefficients will differ according to the geometry and dimensions of the interface, the strength of the bond between the dissimilar composite materials, and the range of temperature to which the article will be subjected. A larger interfacial area, a wider temperature range, or a lower bond strength would each require a closer match between the relative thermal expansion coefficients if deformation or bond failure are to be avoided.

A fiber reinforced glass matrix composite structure may be formed by hot pressing layers containing fibers and powdered glass in a shaped die as described in commonly assigned U.S. Pat. No. 4,256,378, by injection molding a mixture of fibers and glass powder as described in commonly assigned U.S. Pat. No. 4,464,192 or by transfer molding as taught in commonly assigned U.S. Pat. No. 4,428,763, the disclosures of which are incorporated herein by reference.

Prior to forming the hybrid composite article, the surface of the preconsolidated glass matrix composite structure is pretreated to promote the adhesion of the resin matrix composite structure to the surface. Pretreatment of the surface may comprise cleaning or degreasing the surface or roughening the surface. The surface may be cleaned or degreased by, for example, contacting the surface with liquid solvent or solvent vapors. Conventional solvents, such as chlorinated solvents, are suitable. The surface may be roughened by, for example, sandblasting or chemical etching. Roughening and cleaning treatments may also be combined, such as sandblasting followed by solvent cleaning.

A preferred technique for roughening the surface of the glass matrix structure comprises leaching back the glass matrix to partially expose the underlying fiber reinforcement by contacting the surface with an acid or base solution. This technique improves adhesion because the partially exposed fibers at what is to eventually comprise the glass matrix/resin matrix interface will ultimately be bonded into both matrices. Contacting the surface with a hydrofluoric acid solution for a time period between about 10 seconds and about 1 minute is a particularly effective chemical etching treatment. The most preferred pretreatment method is leaching back the glass matrix to partially expose the fiber reinforcement by immersing the preconsolidated glass matrix composite structure in concentrated hydrofluoric acid for a time period of about 10 seconds to about 20 seconds, removing the structure from the acid bath, and rinsing the surface with water.

It should be noted that the structural integrity of the hybrid composite article may also be improved by providing the glass matrix composite structure with a geometrically complex surface to provide for mechanical interlocking between the glass matrix and resin matrix regions of the hybrid composite article.

A hybrid composite article according to the present invention is formed by molding and curing a mass of fiber-containing resin in contact with a preconsolidated fiber reinforced glass matrix composite structure. The mass of fiber-containing resin is molded and cured by conventional procedures which differ with the particular choice of resin matrix material. For example, the preferred resin matrix material, PMR15, may be cured by heating to 600° F. for 60 minutes under 1000 psi pressure. The high temperature resistance and low thermal expansion make the preconsolidated glass matrix composite amenable to a reinforced resin molding process. The curing of the resin matrix consolidates the resin matrix composite and simultaneously forms an integral bond between the resin matrix composite and the glass matrix composite to form the hybrid composite article.

A hybrid composite article according to the present invention may be formed, for example, by placing one or more preconsolidated glass matrix structures in a predetermined orientation within a mold die into which a fiber reinforced resin is injected and cured. A hybrid composite article according to the present invention may also be formed, for example, by stacking layers of resin impregnated fiber-containing sheets or tapes, positioning at least one preconsolidated glass matrix composite in a predetermined orientation relative to the unconsolidated stack of resin impregnated layers, compressing the assembly so formed in a shaped die and finally curing the resin matrix to consolidate the resin matrix and simultaneously bond the resin matrix to the glass matrix.

No matter what molding process is used, the preconsolidated glass matrix structures are so oriented as to correspond to regions of the article wherein the properties of a glass matrix composite would more closely match the anticipated demands of the application than would the properties of the resin matrix composite. For example, the glass matrix composite may be fully or partially embedded in the unconsolidated resin matrix composite or may be placed in contact with a surface of the unconsolidated resin matrix composite in such a way as to correspond to a region of the consolidated hybrid article to which exposure to elevated temperature is anticipated. This concept is illustrated in FIGS. 1 and 2.

FIG. 1 is a diagram of a hybrid composite external flap for a gas turbine engine. The flap consists of a body (1), two forward attachment inserts (2) and two aft attachment inserts (3). The body (1) comprises graphite reinforced polyimide matrix composite, in order to take advantage of the high specific modulus and strength of the material as well as the ease with which a large article may be fabricated using such material. The attachment inserts (2) and (3) correspond to regions of the article in which a fastening device would be used to attach the flaps to the gas turbine. The attachment inserts (2) and (3) each comprise graphite reinforced borosilicate glass matrix composite in order to take advantage of the high abrasion resistance of that material to form a wear surface that protects the resin matrix body. The external flaps could not be fabricated using only resin matrix composite because of the anticipated exposure of localized regions of the article to conditions that would exceed the abrasion resistance of the material. While the external flaps could be fabricated using only glass matrix composite, the resulting component would be heavier, more expensive, and have lower strength.

Figure 2:
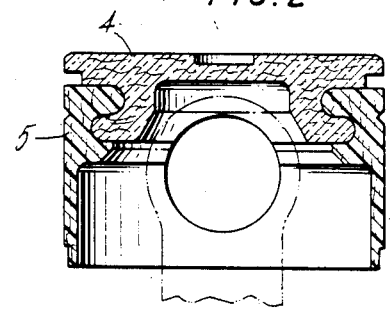
FIG. 2 shows a hybrid composite piston for an internal combustion engine.

FIG. 2 is a diagram of a hybrid composite piston consisting of a graphite reinforced borosilicate glass composite cap (4) and a graphite reinforced polyimide matrix composite body (5). The use of the graphite reinforced borosilicate glass matrix composite for the cap (4) is the basis for a number of advantages. The high temperature resistance and low thermal conductivity of the glass matrix composite cap (4) provides a thermal barrier which protects the resin matrix body (5) of the piston. The low thermal expansion coefficient of the glass matrix material permits the maintenance of appropriate tolerances. The excellent wear resistance of the glass matrix composite provides a durable structure in the high wear region of the piston, at the outer diameter of the cap (4), between the ring groove and top surface. The high strength of the glass matrix composite provides a structurally sound piston cap (4) and a high quality ring and groove structure. The piston could not have been fabricated solely from fiber reinforced resin matrix composite because of the anticipated exposure of localized regions of the piston to wear and temperature conditions that would exceed the abrasion and temperature resistance of the resin matrix composite. The piston could have been fabricated solely from glass matrix composite, but at the expense of increased weight and increased complexity of fabrication.

EXAMPLE

A graphite fiber (HMU, Hercules Incorporated) reinforced glass matrix (Corning 7740, Corning Glass Works) composite panel (1 inch×2 inches×¼ inch) was fabricated according to the method taught in commonly assigned U.S. Pat. No. 4,256,378.

The surface of the panel was pretreated by immersion in concentrated hydrofluoric acid for 15 seconds.

The glass matrix composite panel was then positioned in a die cavity such that there were six plies of graphite fiber reinforced resin matrix below, six plies of graphite fiber reinforced resin matrix above and twelve plies of graphite fiber reinforced resin matrix around the glass matrix composite. The resin matrix composite comprised continuous graphite fibers (Celion, BASF) and polyimide resin (PMR-15, CTL-Dixie, Inc.). The hybrid structure was consolidated and cured by heating to 600° F. for 60 minutes under 1000 psi pressure.

Figure 3:
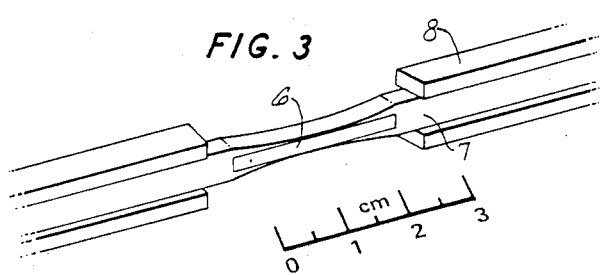
FIG. 3 shows a hybrid composite tensile test specimen.
Figure 3A:
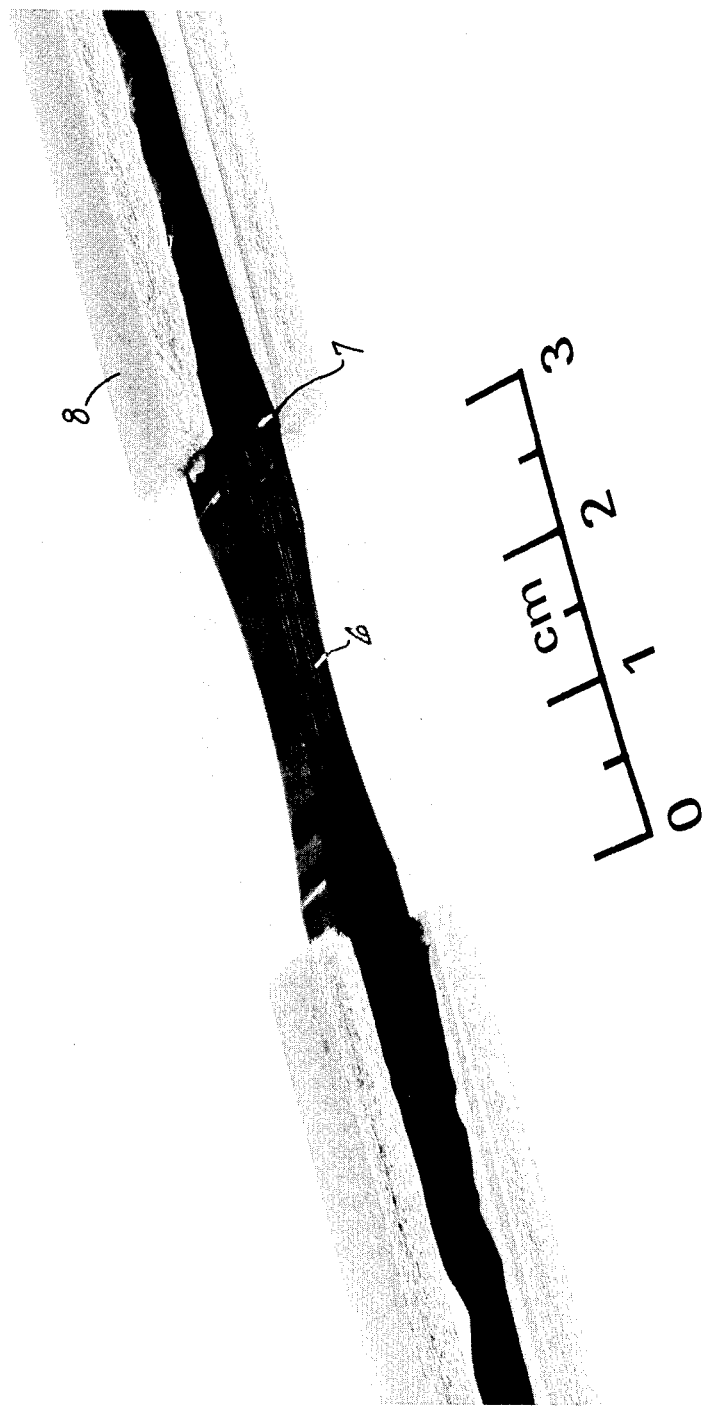
FIG. 3A is a photograph of the hybrid composite tensile test specimen of FIG. 3.

The consolidated hybrid structure was sectioned and ground into a shape suitable for tensile testing. A hybrid composite tensile specimen is shown in FIG. 3. FIG. 3A is a photograph of the hybrid composite tensile specimen of FIG. 3. The specimen comprises a fiber reinforced glass matrix composite structure (6) embedded between fiber reinforced resin matrix layers (7). Four fiber reinforced resin matrix blocks (8) were bonded to the tensile specimen to allow the specimen to be securely gripped in the jaws of the tensile testing apparatus. Two such specimens were subjected to tensile testing. The specimens exhibited an average interfacial shear strength of about 800 pounds per square inch of resin matrix composite to glass matrix composite bond area.

The hybrid composite of the present invention features the low density, high strength and ease of fabrication of a resin matrix composite and the high temperature and abrasion resistance of glass matrix composites. The uniquely advantageous balance of properties which are exhibited by the hybrid composite of the present invention may be precisely tailored to meet the demands of a number of applications that cannot be adequately addressed using conventional composite technology.

Although this invention has been shown and described with respect to detailed embodiments thereof, it will be understood by those skilled in the art that various changes in form and detail thereof may be made without departing from the spirit and scope of the claimed invention.

We claim:

1. A hybrid composite external flap for a gas turbine engine, comprising:

an elongated graphite fiber reinforced polyimide matrix composite body extending from a forward end to an aft end and having an outer surface and an opposite inner surface, two graphite fiber reinforced borosilicate glass matrix composite forward attachment inserts, integrally bonded to the forward end of the body, and two graphite fiber reinforced borosilicate glass matrix aft attachment inserts, each integrally bonded to the aft end of the body, wherein the forward and aft attachment inserts provide localized abrasion resistant regions whereby the hybrid composite external flap may be attached to a gas turbine engine.

* * * * *